United States Patent [19]
Harman

[11] Patent Number: 5,448,853
[45] Date of Patent: Sep. 12, 1995

[54] PLANT GROWING APPARATUS

[76] Inventor: Benjamin J. Harman, Rte. #3, Box 587, Falkville, Ala. 35622

[21] Appl. No.: 206,347

[22] Filed: Mar. 7, 1994

[51] Int. Cl.⁶ .............................................. A01G 31/00
[52] U.S. Cl. .......................................... 47/60; 47/17; 248/329
[58] Field of Search ............ 47/60 R, 60 WL, 60 EC, 47/17 R, 17 EC, 17 MS; 296/173; 248/329; 52/28

[56] References Cited

U.S. PATENT DOCUMENTS

| | | | |
|---|---|---|---|
| 322,515 | 7/1885 | Young | 248/329 |
| 847,580 | 3/1907 | Jacobsen | 248/329 |
| 3,445,134 | 5/1969 | Pair | 296/173 |
| 3,823,975 | 7/1974 | Cooper | 296/173 |
| 4,091,566 | 5/1978 | Horváth | 47/60 EC |

FOREIGN PATENT DOCUMENTS

| | | | |
|---|---|---|---|
| 96945 | 12/1983 | European Pat. Off. | 47/60 EC |
| 557409 | 12/1977 | U.S.S.R. | 52/28 |

*Primary Examiner*—Henry E. Raduazo
*Attorney, Agent, or Firm*—George A. Bode; Michael L. Hoelter

[57] ABSTRACT

A portable plant growing cart that can accommodate one or more plant trays thereon, This cart is constructed of a plurality of rigid frames which preferably are pivotally connected together so as to aid in the storage of the cart when not in use. A movable light source is supported from these separate frames above the trays at any desired elevation, Additionally, a fabric-like reflective shroud is supported over both the light source and the cart so as to reflect light back towards the plant trays when desired.

16 Claims, 5 Drawing Sheets

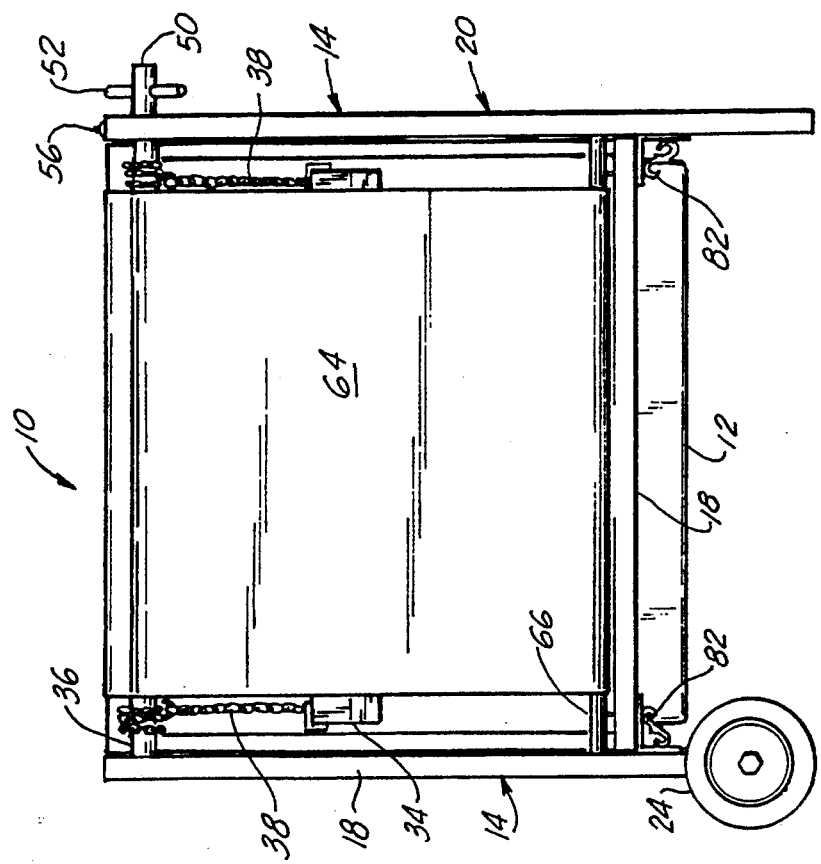
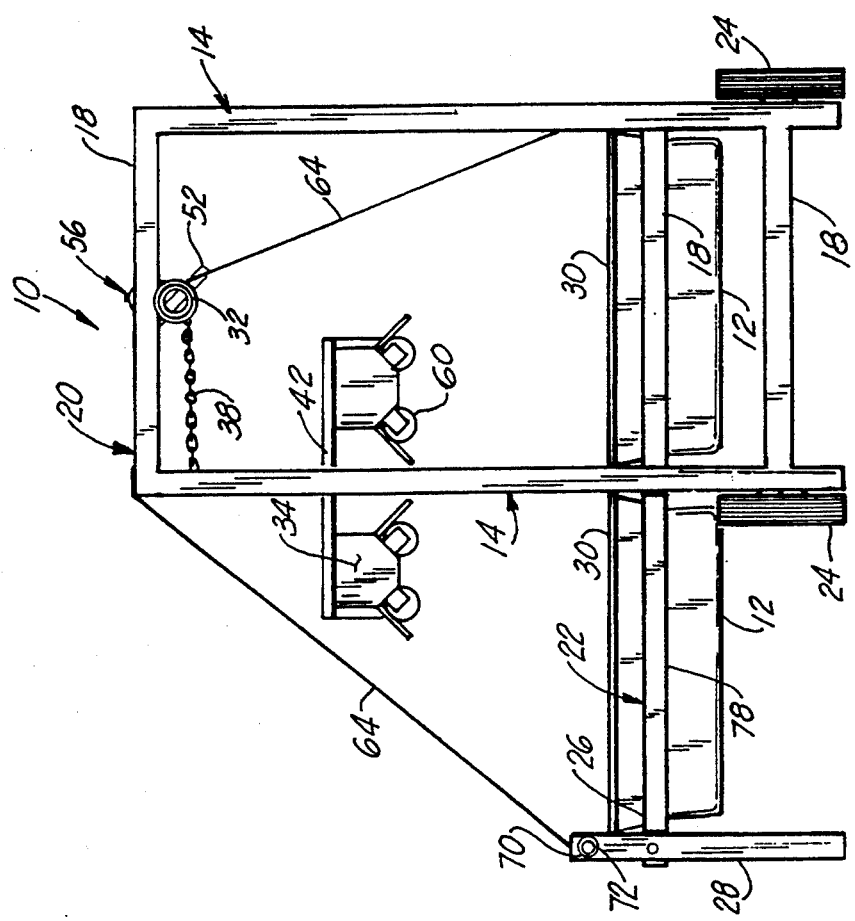

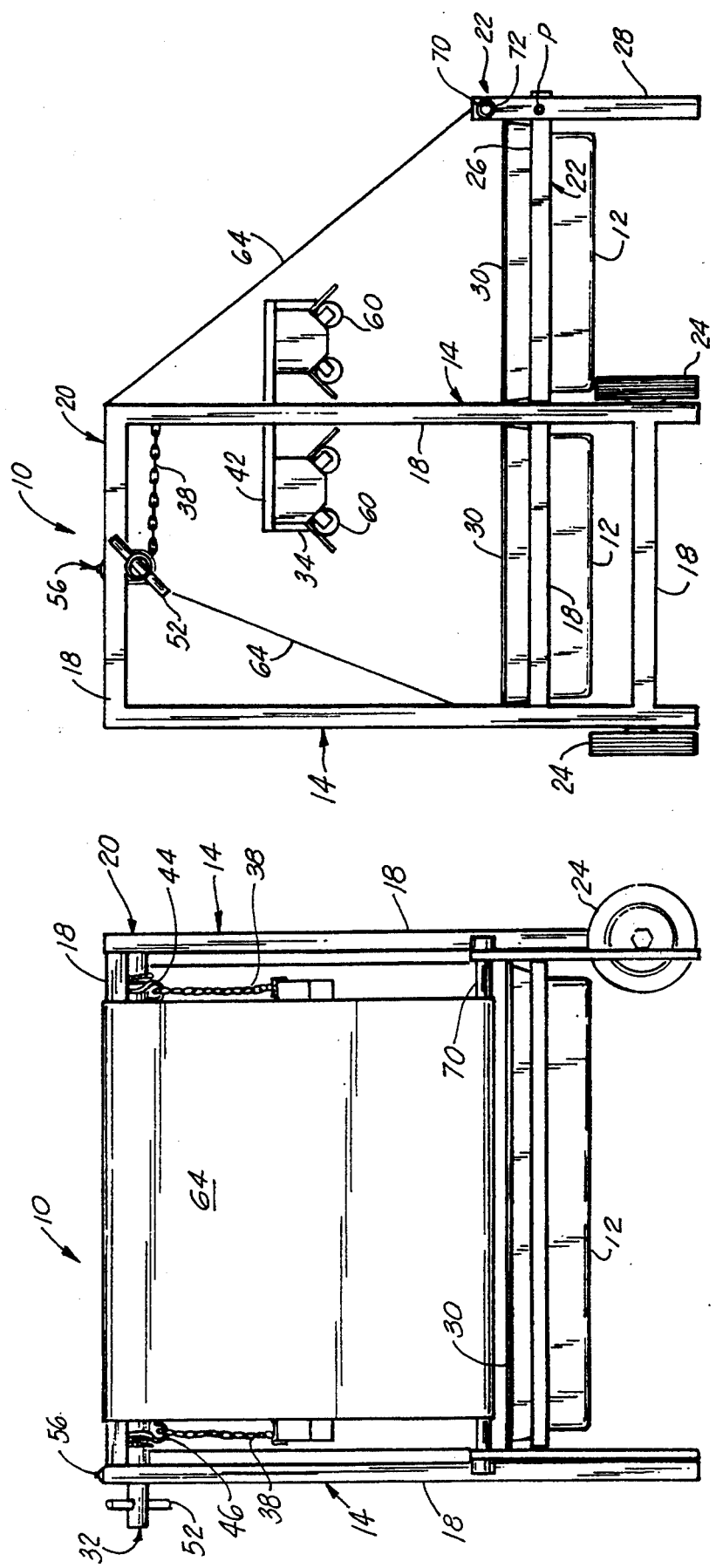

PLANT GROWING APPARATUS

BACKGROUND OF THE INVENTION

1. Field of the Invention

This invention pertains generally to horticulture implements and more specifically to a portable cart used to germinate seedlings and support plant growth.

2. General Background

Many devices exist that either assist in the germination of seedlings or otherwise support plant growth. Some such devices are limited solely to the germination of seedlings such as U.S. Pat. No. 4,130,964 issued to Caballero, U.S. Pat. No. 4,258,501 issued to Brown, and U.S. Pat. No. 5,042,196 issued to Lukawski. Other devices such as U.S. Pat. No. 4,543,744 issued to Royster and U.S. Pat. No. 5,152,099 issued to Nilssen are useful solely for more mature plants. However, a third group of such devices can be utilized for both seedlings and more mature plants. Typical examples of these devices include U.S. Pat. No. 3,314,192 issued to Park, U.S. Pat. No. 2,709,838 issued to Zausner, and U.S. Pat. No. 4,292,762 issued to Fogg, et al.

Unfortunately, in this last category, not all of these devices are portable nor can their light source, whether natural or artificial, be readily adjustable or controlled. Additionally, these devices often require elaborate mechanisms to control and/or maintain proper humidity levels and they do not offer a simple means of providing an adequate source of reflective light from all angles so as to closely imitate naturally available reflected light.

It is thus an object of the present invention to provide a device which can be used both to germinate seedlings as well as support the growth of more mature plants.

Another object of the present invention is to provide such a device that is portable as well so that it can easily be moved as desired.

Still another object of this invention is to provide a means of utilizing both naturally available light as well as artificial light, either individually or in combination, as desired.

Yet another object of the present invention is to provide a means of quickly and easily adjusting the level of the artificial light source depending upon the needs of the plant.

A further object of this invention is to provide a means of shrouding or covering the plants as needed in order to control light levels as well as to maintain the proper degree of humidity for the enclosed plants/seedlings.

Still another object of this invention is to provide a device that can be collapsed for easy storage when not in use. These and other objects and advantages of this invention will become obvious upon further investigation.

SUMMARY OF THE PRESENT INVENTION

The preferred embodiment of the apparatus of the present invention solves the aforementioned problems in a straightforward and simple manner. What is disclosed is a growing cart that is constructed of a plurality of interconnected rigid frames that support one or more trays thereon. A movable light source is supported from these rigid frames above the one or more trays so as to provide light to these trays. A wench is secured to the rigid frames and is operated to adjust or control the elevation of the light source above the one or more trays. Surrounding these trays is a removable reflective shroud that is also spaced from the light source. This shroud is positioned around and over the trays and the cart for reflecting light onto the trays.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 2 is a left side elevational view of the embodiment of FIG. 1;

FIG. 3 is a front elevational view of the embodiment of FIG. 1;

FIG. 4 is a rear elevational view of the embodiment of FIG. 1;

FIG. 5 is a right side elevational view of embodiment of FIG. 1;

DETAILED DESCRIPTION OF THE PREFERRED EMBODIMENT

Figure 1:
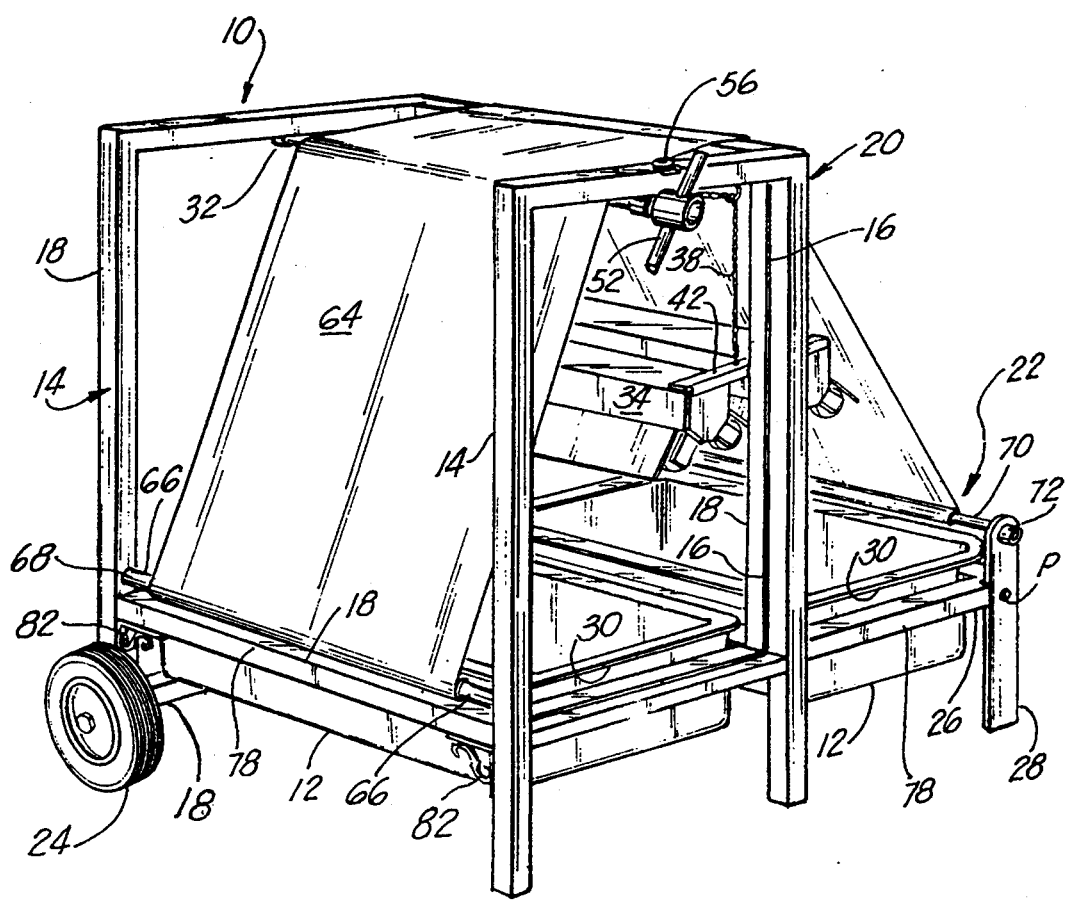
FIG. 1 is a front and right side perspective view of the preferred embodiment of the present invention in its assembled state.
Figure 7:
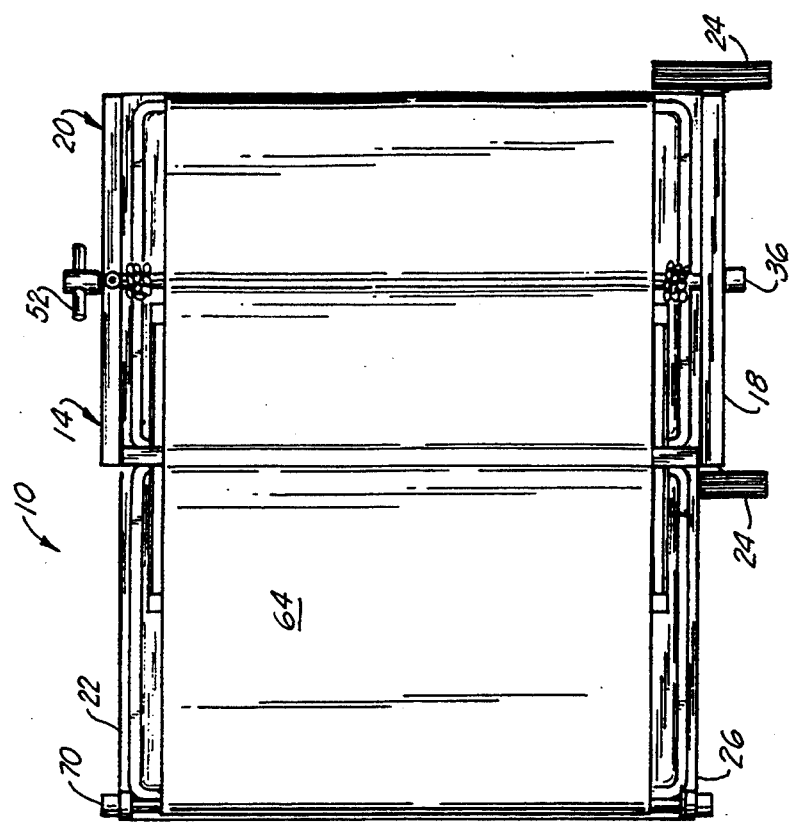
FIG. 7 is a top plan view of the embodiment of FIG. 1.
Figure 6:
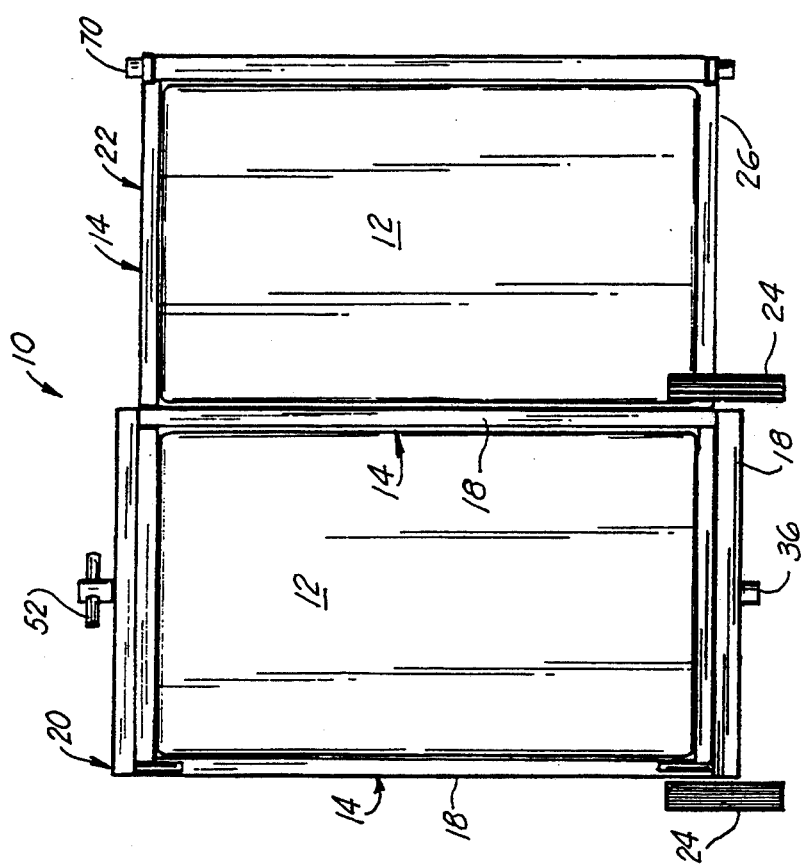
FIG. 6 is a bottom plan view of the embodiment of FIG. 1.

Referring initially to FIGS. 1 through 8, there is shown collapsible wheeled cart 10 configured to support one or more trays 12 thereon. Cart 10 is, in this embodiment, illustrated as being comprised of a plurality of individual rigid frames 14 which are pivotally secured together via hinges 16 (see FIG. 8). This arrangement aids in the storage of cart 10 when not in use, however, the individual rigid frames 14 of cart 10 can be more fixedly secured together if so desired.

These individual rigid frames 14 are, in turn, constructed of a plurality of tubular members 18, however, other configurations of members 18 are equally likely. Members 18 are preferably made of a reinforced fiberglass material, but, they can also be made of plastic, wood, or metal if so desired. It is also preferable for the various members 18 of each frame 14 to be rigidly secured together to prevent any accidental disassembly. Members 18 also provide the variously needed cross-bracing for each frame 14.

Figure 8:
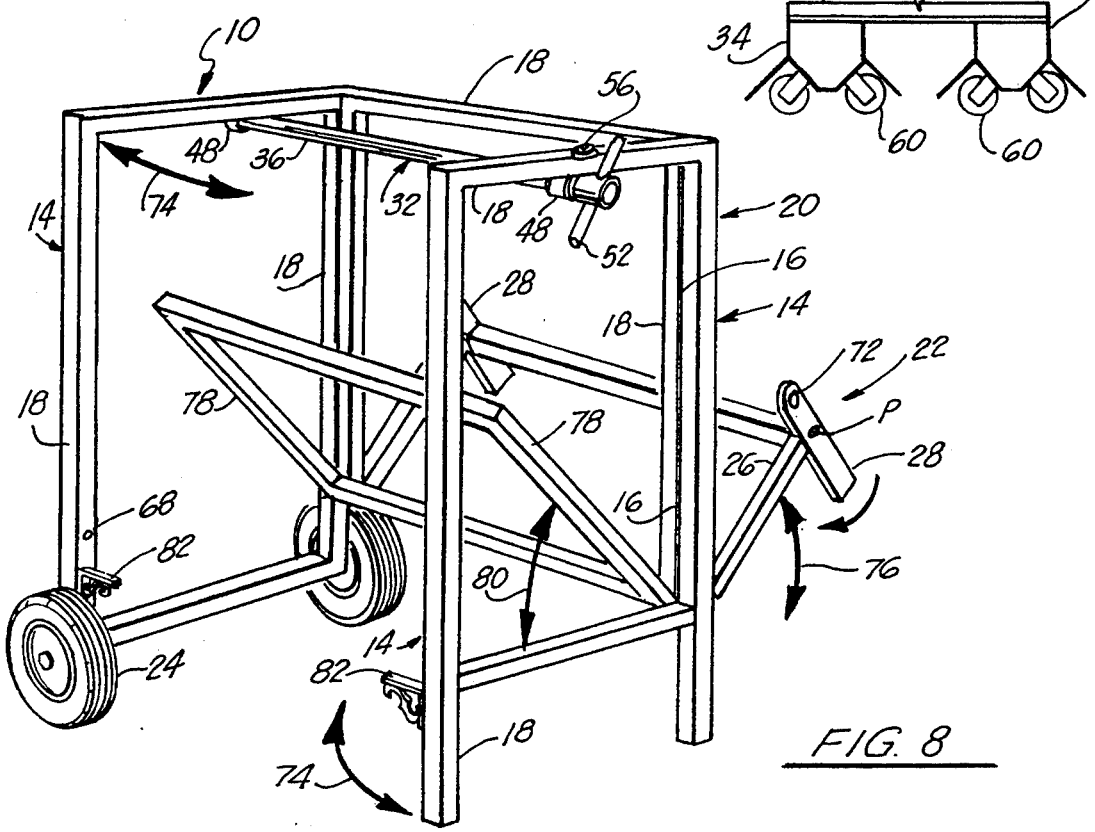
FIG. 8 is a front and right side perspective view of the embodiment of FIG. 1, with portions of the invention removed for clarity, illustrating the assembly/disassembly of the invention.

Referring now more specifically to FIG. 8, the various individual frames 14 are pivotally secured together via hinges 16. Hinges 16 are secured in the normal fashion between adjacent frames 14 with there usually being two (more or less) such hinges 16 to a connection. In this fashion, cart 10 can be assembled and/or disassembled as needed.

As shown in the drawing, cart 10 is configured with an upright main portion 20 that supports a first tray 12 thereon and a side extension 22 that supports a second tray 12 thereon. Other configurations are likely, and, if desired, cart 10 can be configured to support only one tray 12 thereon or cart 10 can be configured to support more than two trays 12 thereon. Also, main portion 20 is configured with a pair of wheels 24 mounted in a typical manner so as to ease the portability of cart 10.

Extension 22 is also constructed of a frame 14, consisting of a plurality of tubular members 18 rigidly secured together, with this frame 14 being pivotally secured to main portion 20. Secured to the far end 26 of extension 22 are two (more or less) upright supports 28 which support this end 26 at the proper elevation so as to maintain second tray 12 in a level position. These upright supports 28 may be constructed of the same material as members 18 or these upright supports 28 can be constructed of a different material. It is also possible for these upright supports 28 to pivot with respect to end 26 of extension 22 (about POINTS "P"—only one is shown) so as to ease the folding and storage of cart 10 when not in use.

When cart 10 is in its open or assembled position, one or more trays 12 are supported upon various members 18 of the different frames 14. Trays 12, generally made of plastic and having a lip 30, are sized to fit within an opening defined by the various members 18. In this fashion, lip 30 will engage these members 18 thereby securely supporting trays 12 within cart 10. Other materials of construction may also be used for trays 12, with these trays 12 preferably being un-perforated so as to prevent any leakage or loss of the contents of trays 12. In some situations, however, it may be desirable to perforate trays 12 and this can be readily accomplished.

Figure 10:
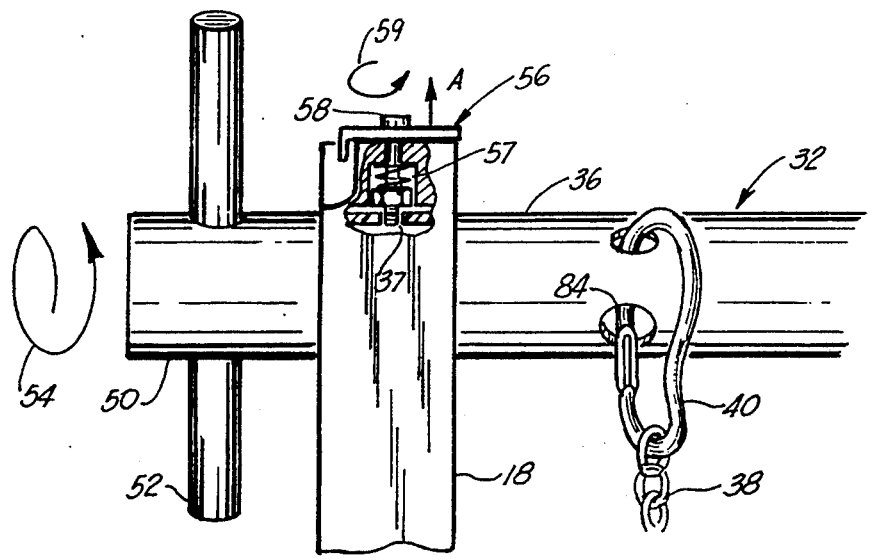
Figure 9:
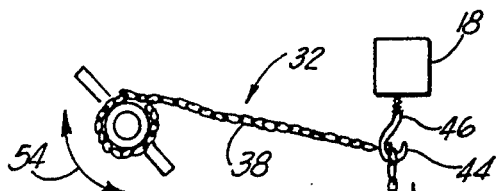
FIG. 9 is an enlarged pictorial view of the light fixture portion of the invention; and, FIG. 10 is an enlarged pictorial view, partially broken away, of the locking mechanism portion of the invention.

Secured across the upper region of oppositely spaced rigid frames 14 is wench 32 used to raise or lower light fixture 34 with respect to trays 12. Wench 32 generally consists of an elongated tube 36 that is free to rotate about its longitudinal axis. Around tube 36, a chain, cable, rope, or the like 38 is wound with one end of this chain, etc. 38 being secured to tube 36 via clasp 40 as best shown in FIG. 10. Other means of attachment are also likely. The other end of chain, etc. 38 is secured to light fixture 34 in a conventional manner, such as to bracket 42. As shown in FIG. 9, chain 38 generally extends over guide 44 before terminating at light fixture 34. In this case, guide 44 consists of a hook 46 secured underneath upper horizontal member 18. There are also preferably two such chains, etc. 38 per wench 32, as shown in FIGS. 3 and 4, located at the opposite ends of tube 36.

These opposite ends of tube 36 are pivotally or rotationally mounted or secured to their respective rigid frame 14, such as by being suspended from an upper horizontal member 18 via journal brackets 48. Other means of attachment, however, are equally likely. One end of tube 36, end 50, is configured with a handle 52 to aid in the rotation of tube 36 as shown by ARROW 54. Such rotation results in a corresponding change in elevation of light fixture 34 above trays 12. Additionally, a locking mechanism 56 is employed to prevent any unwanted or undesired rotation of tube 36.

In this embodiment, locking mechanism 56 consists of spring biased bolt 58 mounted on upper member 18 which selectively engages one or more holes 37 in tube 36 (several holes are equally spaced circumferentially of tube 36). Other designs are also likely. In the illustrated design, once the desired rotation of tube 36 is achieved (i.e. light fixture 34 is positioned at the desired elevation), tube 36 is restrained in place by reinserting bolt 58 (ARROW 59) in one or more of the aligned holes 37 in tube 36. The spring 57 bias of bolt 58 retains bolt 58 in place within tube 36.

As shown in FIGS. 1, 2, 5 and 9, a plurality of typical florescent light fixtures 34 are suspended underneath wench 32 at the desired height above trays 12 for proper plant growth. However, other types of light fixtures 34 are also likely, such as incandescent. Of course, if desired, only one light fixture 34 can be so suspended or more than two light fixtures 34 can be so suspended. The illustrated florescent light fixtures 34 are of typical construction and preferably include removable light bulb covers 60 that enclose each of the florescent bulbs therein. Cover 60 protects these bulbs from breakage and they also are useful in the disposal of a spent bulb. To dispose of such a spent bulb, merely place the bulb in its respective cover 60 and break it, such as by striking it with a hammer or the like. The resulting small glass shards now contained within cover 60 can then be properly disposed of.

Referring now to FIG. 1, there is shown fabric-like elongated shroud or reflective cover 64 which is secured to and wound around first rod 66 mounted between opposite rigid frames 14 of main portion 20. Rod 66 is generally positioned within aligned holes 68 in these oppositely spaced members 18. The other end of shroud 64 is secured to and wrapped around a second rod 70 mounted between upright supports 28 of extension 22. Second rod 70 is secured in holes 72 in an upper region of upright supports 28 as shown. Both rods 66 and 70 can be removed prior to the disassembly of cart 10 by removing them from their respective holes 68 and 72. (Thus, both rods 66 and 70 are not shown in FIG. 8.) Intermediate these rods 66 and 70, shroud 64 extends upwardly over wench 32 and, preferably, an upper horizontal member 18 of a frame 14 of main portion 20 before angling downwardly toward second rod 70 of extension 22.

The interior surface of fabric-like shroud 64 is preferably constructed of a reflective material so that the light emitted by light fixture 34 is reflected back toward trays 12. Additionally, shroud 64 can be used to increase the humidity level within cart 10, as a wind block for the plants within trays 12, or as a sun block should the natural light available be too excessive.

Referring now to FIG. 8 wherein the assembly of cart 10 is illustrated, one of the first steps would be to unfold the two rigid frames 14 that form a part of main portion 20 as indicated by ARROWS 74. The now U-shaped main portion 20 can be stabilized by unfolding extension 22 as indicated by ARROW 76 so that upright supports 28 can engage the ground and/or floor. It may be necessary to pivot upright supports 28 about POINTS "P" to accomplish this. A further means of stabilizing U-shaped main portion 20 is to install tube 36 within the two brackets 48 secured to the upper horizontal members 18 of opposite frames 14. In order to do this, bolt 58 of locking mechanism 56 will need to be removed and/or lifted (ARROW A) during tube 36 installation. To further stabilize main portion 20, tray support frame 78 can be unfolded as shown by ARROW 80. This tray support frame 78 forms a part of main portion 20 as indicated. The opposite ends of tray support frame 78 will come to rest on brackets 82, each of which are secured to one vertical member 18 of oppositely spaced frames 14 of main portion 20. Other means of supporting tray support frame 78, other than by the use of brackets 82, are also likely.

Once fully assembled, trays 12 can be positioned within tray support frame 78 of main portion 20 and also within extension 22. Ideally, trays 12 are at the same level, but they can be located at different levels if desired. This will enable cart 10 to accommodate a variety of different plant heights.

Further assembly of cart 10 incorporates the step of connecting clasp 40, which is secured to the end of chain 38, to the opposite ends of tube 36, such as by inserting clasp 40 through openings 84 at either end of tube 36. Light fixture 34 can then be secured, if not already accomplished, to the other end of chain 38 such as via bracket 42. Handle 52 on one end of tube 36 can now be rotated to adjust the height of light fixtures 34, such rotation winding chain 38 around tube 36. Locking mechanism 56, such as spring 57, biased bolt 58, would then be engaged to prevent any inadvertent unwinding of chain 38.

After the assembly of light fixtures 34, or in the event no such light fixture 34 is to be utilized, first and second rods 66 and 70 can be installed in their respective holes 68 and 72 to provide further stability to cart 10. Shroud 64 would then be wrapped around rods 66 and 70 and draped over tube 36 and an upper horizontal member 18 of main portion 20.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A plant growing apparatus comprising:
   (a) a plurality of pivotally connected rigid frames having means for supporting one or more growing trays thereon, said frames including an interconnected main upright frame having opposed side members and side extension frame, both of said interconnected frames adapted to support a tray thereon;
   (b) light means supported from one of said frames above said one or more trays for providing light to said one or more trays;
   (c) means secured to said one of said frames for adjusting the elevation of said light means above said one or more trays, said means comprising: an elongated tube secured above said one or more trays between said opposed side members of said upright frame; and,
   (d) reflective shroud means spaced from said light means and positioned around and over said one or more trays for reflecting light onto said one or more trays.

2. The apparatus as set forth in claim 1, wherein said light means comprise a florescent bulb fixture.

3. The apparatus as set forth in claim 1, wherein said elongated tube is removably secured to one of said frames.

4. The apparatus as set forth in claim 3 wherein said elongated tube is pivotable about its longitudinal axis when supported by said frame means.

5. The apparatus as set forth in claim 4 wherein said means for adjusting elevation further comprises a handle secured to one end of said tube for rotating said tube about its longitudinal axis.

6. The apparatus as set forth in claim 5 wherein said means for adjusting elevation further comprises locking means for restricting any further rotation of said tube about its longitudinal axis.

7. The apparatus as set forth in claim 6 wherein said locking means comprise a bolt which engages said tube, thereby preventing any further rotation of said tube.

8. The apparatus as set forth in claim 7 wherein said means for adjusting elevation further comprises a flexible elongated chain or cable having one end secured to said tube and an opposite end secured to said light means, said chain or cable being selectively wound or unwound around said tube upon the rotation of said tube about its longitudinal axis.

9. The apparatus as set forth in claim 8 wherein said extension comprises one or more upright supports for supporting said extension at the desired elevation.

10. The apparatus as set forth in claim 9 wherein said upright supports are pivotally secured to said extension.

11. The apparatus as set forth in claim 9 wherein said main portion comprises a first elongated rod and said extension comprises a second elongated rod and wherein said shroud means are secured to and extend between said first and said second rods.

12. The apparatus as set forth in claim 11 wherein said shroud means and said first and second rods are removable.

13. The apparatus as set forth in claim 12 wherein said shroud means comprise a flexible fabric-like material having a reflective surface on at least one side thereof.

14. The apparatus as set forth in claim 13 wherein said members are constructed of fiberglass.

15. The apparatus as set forth in claim 14 further comprising wheel means secured to one side of said main upright portion for moving said apparatus about.

16. The apparatus as set forth in claim 15 wherein said trays are configured with a lip which engage and rest upon selected said members.

* * * * *